United States Patent Office 3,514,357
Patented May 26, 1970

3,514,357
METHOD FOR OBTAINING ADHESION BETWEEN OLEFIN COPOLYMERS OR TERPOLYMERS AND NATURAL OR SYNTHETIC RUBBERS
Luigi Torti, Stefano Marcello, and Guido Bertelli, Ferrara, Italy, assignors to Montecatini Edison, S.p.A., Milan, Italy, a corporation of Italy
Filed July 21, 1965, Ser. No. 473,801
Claims priority, application Italy, July 22, 1964, 15,965/64
Int. Cl. B32b 25/04, 27/06, 25/16
U.S. Cl. 156—306
21 Claims

ABSTRACT OF THE DISCLOSURE

A method of bonding olefin copolymers or terpolymers to natural or synthetic diene rubbers by covulcanizing the two types of rubber in direct contact, the diene rubber having a siliceous filler.

---

Figure 1:
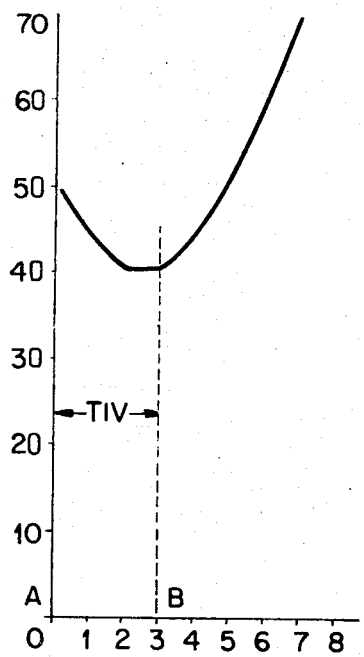
Figure 2:
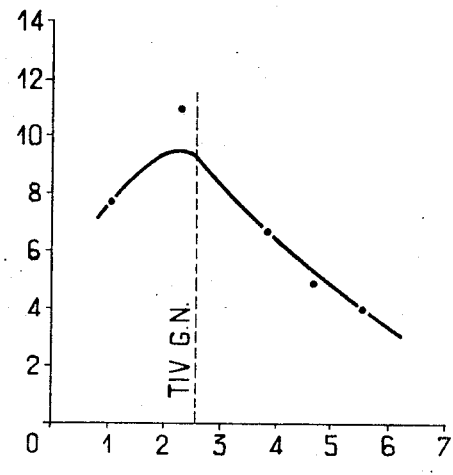

The present invention relates to a process for obtaining the adhesion of linear saturated amorphous copolymers of ethylene with a higher alpha-olefin, or of terpolymers of ethylene with a higher alpha-olefin and a cyclic or acyclic polyene having non-conjugated double bonds, to unsaturated natural or synthetic elastomers; and to the vulcanized articles thus obtained.

In practice, it is desirable to combine the excellent dynamic characteristics (low elastic hysteresis, high rebound elasticity) of natural rubber with the superior resistance to abrasion, ageing and chemical agents of certain new saturated or low-unsaturation synthetic rubbers consisting of amorphous elastomeric interpolymers of ethylene with propylene and, optionally, a cyclic or acyclic diene containing non-conjugated double bonds.

This is of particular interest in the manufacture or retreading of tires of combined structure, in which the carcass is made of natural rubber or of another unsaturated rubber having a low elastic hysteresis and a high elasticity, and the tread consists of an olefin copolymer or terpolymer.

The structure of these new elastomers, which is substantially different from that of diene rubbers, in general renders difficult the adhesion between layers of the two materials, due to their different polarity and to the incompatibility between the different rubbers and their respective vulcanization systems.

Diene rubbers, as known, are in general vulcanized with sulfur or a sulfur-releasing compound and accelerators, whereas saturated amorphous copolymers of ethylene with an alpha-olefin require for their vulcanization systems based on organic peroxides and on a free-radical acceptor such as, e.g., sulfur.

It has been proposed to effect adhesion between layers of natural or synthetic diene rubber and of elastomeric saturated amorphous copolymers of ethylene with a higher alpha-olefin by inserting between the two layers an interlayer consisting of a chlorosulphonated ethylene-alpha-olefin copolymer, chemically and physically compatible with the other two layers and with their respective vulcanization systems, and then vulcanizing the three assembled layers.

According to another known method, the adhesion between a diene rubber layer and a layer of olefin copolymer containing as vulcanizing agents organic peroxides and sulfur in amounts higher than 5% by weight on the weight of the copolymer is effected by carrying out the vulcanization at temperatures higher than 170° C.

For practical reasons, in both of the aforementioned procedures, recourse was made to an intermediate layer of copolymer containing the vulcanizing agents in said proportions, in order to avoid increases in the cost and problems deriving from an increase in the offensive odor of the vulcanizates due to the presence of excessive amounts of vulcanizing agents in the whole layer of copolymer.

It has also been proposed to obtain adhesion between a diene rubber layer and a layer of olefin copolymer or terpolymer by using a diene rubber containing a white mineral filler and an olefin copolymer or terpolymer having a Mooney viscosity higher than 60. Employing this method it is possible to use normal vulcanization recipes for both layers and, if desired, to dilute the copolymer or terpolymer of Mooney viscosity above 60 with, for instance, mineral oils, in order to improve its workability.

These methods have various disadvantages, such as, for example, the need of an interlayer and the fact that, while an adhesion effective under static stresses may be obtained, the resistance to dynamic and thermal stresses is low.

An object of the present invention is to provide a new method for obtaining an effective adhesion, even under heavy load and high temperature, between layers of diene rubber and layers of elastomeric olefin copolymers or terpolymers, which method does not show the aforementioned inconveniences.

A further object of the present invention is to provide new and valuable vulcanized articles having combined structure and consisting of layers of natural or synthetic diene rubber and of layers of the olefin copolymers or terpolymers.

These and other objects of the invention are accomplished by covulcanizing a layer of diene rubber containing a reinforcing filler consisting of a siliceous material and a layer of the elastomeric copolymer or terpolymer, in direct contact with each other, and initiating vulcanization of the two types of rubbers substantially simultaneously, after a time period sufficient to permit reciprocal superficial diffusion of the two layers in direct contact with each other.

It is found that excellent adhesion of the diene rubber and the elastomeric olefin copolymers and/or terpolymers is obtained at both ambient temperatures and at 90–100° C., and without limitation on the Mooney viscosity of either rubber or on the type of vulcanization agents mixed therewith, provided the essential stated conditions are met, namely, that the layers of the two different kinds of rubber are covulcanized in direct contact with each other; the reinforcing filler mixed with the diene rubber is a siliceous material, and, after the time period for allowing superficial reciprocal diffusion of the two layers, the vulcanization of the diene rubber starts substantially concurrently with vulcanization of the elastomeric copolymer or terpolymer.

When the mix containing the vulcanization agents is introduced into the Mooney viscometer at 150° C., the curve of Mooney viscosity shows, at first, a descending segment, then a more or less horizontal segment, and finally an ascending segment.

The indicator used for ascertaining concurrent initiation of the cross-linking is the time interval between the first minute after the introduction of the mix containing the vulcanization agents into the viscometer at 150° C. and the moment at which the curve of Mooney viscosity begins to ascend with a more or less high slope due to the cross-linking.

In the accompanying drawing,

FIGS. 1 to 7 inclusive are curves to which reference is made in the following discussion.

In FIG. 1, the vulcanization starting time (TIV) is represented by the abscissa of point B of the curve, which plots the course of the Mooney viscosity of the mix at 150° C. (on the ordinate) as a function of time (on the abscissa) by assuming as time zero the first minute after the introduction of the mix into the viscometer, i.e. the moment the rotor of the viscometer in the chamber preheated to 150° C. begins to revolve at the speed of 2 r.p.m.

As exemplified below, it has been found that the adhesion increases essentially linearly with increase in the TIV, the latter being the same for both of the layers in direct contact with each other. In practice, good values for the adhesion ($\geq 5$ kg./cm. at 90° C. by the peeling method) are obtained with TIV$\geq 2$ minutes.

This invention thus provides a method for obtaining high values of adhesion between layers of elastomeric materials having different vulcanization starting times, more particularly between a layer of natural or synthetic diene rubber and a layer of a saturated amorphous ethylene/higher alpha-olefin copolymer and/or a low unsaturation terpolymer of ethylene with a higher alpha-olefin and with a cyclic or acyclic non-conjugated diene containing their respectively effective vulcanizing agents and reinforcing fillers by convulcanization of the two layers placed in direct contact with each other at temperatures between 110° C. and 230° C., preferably between 140° C. and 180° C., the method being characterized by the diene rubber layer containing a siliceous filler and by the convulcanization of the layers in direct contact with each other being carried out with vulcanization starting times which are practically the same and higher than 2 minutes, taking as the vulcanization starting time the interval elapsing between the first minute after introduction of the mix into the Mooney viscometer kept at 150° C. and the moment at which the viscosity of the mix begins to increase due to the inception of the cross-linking reaction.

The particular practical importance of the present method resides in that, for the first time, it is possible, by the use thereof, to obtain the required adhesion between diene rubbers and elastomeric olefin copolymers or terpolymers, regardless of the characteristics of the two different types of rubber or elastomers and of the type and amount of vulcanizing agents used, by observing only the two essential and critical conditions:

(1) using a siliceous filler in the diene rubber mix; and
(2) making the vulcanization starting times of the two different mixes coincide and exceed a minimum value of 2 minutes.

Thus, once the composition of one of the respective mixes to be used has been fixed, it is possible to obtain the enhanced adhesion by simply determining the conditions, namely the type and amount of vulcanizing agents mixed therewith, under which the second of the mixes has the same vculcanization starting time as the first mix. As demonstrated in the examples below, we have found that maximum adhesion values are obtained when the vulcanization starting time is the same for each of the mixes constituting the layers in direct contact with each other.

In the practical application of this method, for optimum results, it is preferable to select the composition of one of the vulcanizable mixes, generally the mix based on diene rubber, and to vary the composition of the other vulcanizable mix until the vulcanization starting time (TIV) of the two different mixes is equal. In the case of the mixes based on or comprising the elastomeric ethylene/higher alpha-olefin copolymer, for instance, this can be accomplished readily by varying the type of peroxide used, that is using peroxides of varying decomposition characteristics and vulcanizing effect. If a particular type of peroxide is used, its concentration in the mixture comprising the copolymer can be varied.

According to another embodiment or principle, one can achieve the same end by varying the vulcanization starting time of the mix comprising the copolymer or terpolymer, by suitable selection of the composition and Mooney viscosity of the copolymer or terpolymer to be adhered to the diene rubber.

In certain instances, however, the vulcanization starting times of both mixes can be equalized by varying the composition of the vulcanizing system of the diene rubber, that is, the amount of sulfur the amount and type of accelerator, or, finally, by substituting the peroxidic vulcanization system for the one used conventionally in the vulcanization of the diene rubbers.

The process of the present invention can be applied directly to the different layers forming the article to be manufactured or, e.g., when a white filler is not required in the diene rubber layer, by using a layer of diene rubber containing silica and interposed between the main layers of diene rubber containing, for example with carbon black, and of olefin copolymer or terpolymer.

In the layer of copolymer or terpolymer, which require, as is known, the use of reinforcing fillers for the obtainment of good mechanical characteristics, these fillers, for the purposes of the invention, can be carbon black or a white mineral filler selected from those commonly used in the rubber industry. However, also in these cases, it has been observed that higher adhesion values are obtained when the layer of copolymer or terpolymer also contains a siliceous mineral filler.

The main diene rubbers with a relatively high degree of unsaturation which can be used in accordance with the present invention comprise natural rubber, polybutadiene, polyisoprene, styrene-butadiene copolymers, etc., which can be vulcanized with systems comprising sulfur or peroxides.

The saturated amorphous olefin copolymers which can be used in accordance with the invention are preferably copolymers of ethylene with an alpha-olefin, more particularly of ethylene with propylene or butene-1, having an ethylene content between 20 and 80% by mols, preferably between 40 and 65%, and a molecular weight between 60,000 and 800,000, preferably between 80,000 and 500,000. In practice products having a Mooney viscosity ML(1+4) at 100° C. between 15 and 150 are generally used.

The terpolymers which can be used in accordance with the present invention are those comprising ethylene, propylene or butene-1 and a third monomer consisting of a cyclic or acyclic non-conjugated diene, for example dicyclopentadiene or cyclooctadiene-1,5, and are characterized by the presence of 0.05–1 double bond per 100 carbon atoms and by an ethylene content between 10 and 80% by mols. The molecular weights are in the range specified above for the saturated copolymers.

As mentioned above, a specific characteristic of the invention is the type of reinforcing filler which must be present in the diene rubber layer. In order to obtain effective adhesion, this filler must be siliceous. Anhydrous silica, hydrated silica, aluminum, calcium or magnesium silicates comprised in kaolin, talc, various clays, bentonite, etc. are suitable. The amount to be used can vary from 5 to 200 parts by weight, preferably from 20 to 100 parts by weight, per 100 parts of diene rubber.

In the layer of elastomeric copolymer or terpolymer, on the contrary, the filler may be carbon black or a mineral filler of the reinforcing type such as talc, silica, silicates, alumina, kaolin, clay, etc., in the aforementioned amounts.

The vulcanizing agents to be used in both mixes are not critical for the purposes of the present invention provided they are such that the same vulcanization starting time (TIV) is obtained for both mixes. The systems well known in the art for the different elastomers may be used, including, in general, sulfur and accelerators for diene rubbers and low-unsaturation olefin terpolymers, and organic peroxides and sulfur or other free-radical acceptors for the saturated copolymers.

The organic peroxides can be used, also, for the vulcanization of the unsaturated rubbers.

The vulcanization is usually carried out by heating the mixes, kept in contact under pressure, at temperatures between 100° and 230° C., preferably between 140° C. and 180° C.

The adhesion reported in the following examples was determined according to ASTM D–413/39 Machine Method peeling test; the values are given in kg./cm.

The preparation of the specimen for the determination of the adhesion value is carried out as follows: the mixes which have to adhere are laminated in a calendar into laminae having a thickness of 3 mm.; rectangles of 16 x 8 cm. are then cut and, after treatment of their surface with a solvent such as heptane, benzene, etc., are overlapped.

Moulding and vulcanization are carried out in a press.

The specimens are reinforced with a square fabric on the outer surface in order to facilitate the peeling measurement.

From the vulcanized laminae 3 specimens having a width of 2 cm. are cut with a hollow punch.

The following examples are given to illustrate the present invention without limiting its scope.

EXAMPLE I

Various pairs of mixes on the basis of ethylene-propylene copolymer and of natural rubber containing peroxidic vulcanizing agents of various types and in suitable proportions, so that the various pairs of mixes have a given value of progressively increasing vulcanization starting times, are prepared.

The mixes have the following composition:

Mixes of type A: Parts by wt.
   Ethylene-propylene copolymer (55% by mols of propylene); ML(1+4) 100° C.=60 ---- 75
   Paraffinic oil (V.G.C.=0.80; $d_{15}$=0.861) ---- 25
                                                                        100
   Anhydrous silica ---- 40
   Zinc oxide ---- 2
   Maleic acid ---- 4
   Glycerol ---- 6
   Sulfur ---- 0.75
   Different peroxides ---- Variable Mixes of type B
   Natural rubber (smoked sheet) (ML(1+4) 100° C.=40) ---- 100
   Anhydrous silica ---- 40
   Zinc oxide ---- 5
   2,2' - methylen-bis(4 - methyl-6-tert.butyl-phenol) (antioxidant) ---- 1
   Diphenylguanidine ---- 0.5
   Different peroxides ---- Variable The mixes of Type A, free of vulcanizing agents, are subjected to thermal mechanical treatment for 15 minutes at 200° C. in an inner mixer.

In the following Table 1 are reported the types and the amounts of peroxides used for the various pairs of mixes A and B, and the values of adhesion as a function of the vulcanization starting times.

TABLE 1

| Mix of Type A | | Mix of Type B | | TIV of the two rubbers | Adhesion, kg./cm. (at 90° C.) |
|---|---|---|---|---|---|
| Peroxide | Parts by weight | Peroxide | Parts by weight | | |
| 2,2'-bis[4,4-bis(tert.butylperoxy)cyclo-hexyl]-propane | 6.5 | 2,2'-bis[4,4-bis(tert.butylperoxy)cyclohexyl]-propane | 2.4 | 40'' | 2 |
| 2,2,5,5-tetra(tert.butylperoxy)hexane | 6.5 | 2,2,5,5-tetra(tert.butylperoxy)hexane | 2.4 | 1'20'' | 4.5 |
| Dicumylperoxide | 6.2 | Dicumylperoxide | 2.3 | 2'00'' | 5.5 |
| Tetrachloro di-tert.butylperoxide | 6.5 | Tetrachloro di-tert.butylperoxide | 2.4 | 2'30'' | 10 |
| 2,5-dimethyl-2,5-di(tert.butylperoxy)-hexane | 5.8 | 1,5-dimethyl-2,5-di(tert.butylperoxy)-hexyn-3 | 1.5 | 3'20'' | 11.5 |

As is apparent from Table 1, the adhesion increases progressively by increasing the TIV and reaches satisfactory values, higher than 5–6 kg./cm. at 90° C., only with TIV values higher than a minimum of 2 minutes.

EXAMPLE II

Mixes on the basis of natural rubber, having a given formulation of the vulcanization ingredients, are made to adhere with the same number of mixes on the basis of ethylene-propylene copolymer containing various amounts of different peroxides.

The mixes have the following composition:

Rubber mix: Parts by wt.
   Natural rubber (smoked sheet) ML(1+4) 100° C.=40 ---- 100
   Anhydrous silica ---- 40
   Zinc oxide ---- 5
   2,2'-methylen-bis(4-methyl-6-tert. butylphenol) (as antioxidant) ---- 1
   Diphenylguanidine ---- 0.5
   Sulfur ---- 0.4
   Alpha, alpha'-bis(tert. butylperoxy)-diisopropylbenzene ---- 2.1

Copolymer mix:
   Ethylene-propylene copolymer (55% by mols of propylene) ML(1+4) 100° C.=60 ---- 75
   Paraffinic oil (see Example I) ---- 25
                                                                      100
   HAF carbon black ---- 50
   Zinc oxide ---- 5
   Polymerized 2,2,4 - trimethyl-1,2-dihydroquinoline (antioxidant) ---- 0.5
   Pine tar ---- 0.5
   Sulfur ---- 0.5
   Various peroxides ---- Variable In the following Table 2 are reported values of adhesion as a function of TIV between mixes on the basis of copolymers, containing various peroxides, at parity of effective peroxidic groups, and the mixes on the basis of natural rubber with fixed formulation of the vulcanizing agents.

TABLE 2

| Peroxide type | Amounts by mols | TIV of copolymers | Adhesion, kg./cm. (at 90° C.) | TIV of natural rubber | Vulcanization conditions |
|---|---|---|---|---|---|
| 2,2-bis[4,4-bis-(tert.butylperoxy)cyclohexyl] propane | 0.013 | 1'00'' | 7.5 | | 10', 165° C. |
| 2,2,5,5-tetra-(tert.butylperoxy)hexane | 0.013 | 2'15'' | 11 | 2'35'' | 15', 165° C. |
| Dicumyl peroxide | 0.013 | 3'50'' | 7 | | 30', 165° C. |
| $\alpha,\alpha$ !-bis(tert.butylperoxy)-diisopropylbenzene | 0.0087 | 4'35'' | 5 | | 40', 165° C. |
| Tetrachloro di-tert.butylperoxide | 0.013 | 4'35'' | 2 | | 50', 165° C. |
| 2,5-dimethyl-2,5-di-(tert.butylperoxy)hexane | 0.012 | 6'00'' | 3.5 | | 60', 165° C. |

As is evident, the best adhesions are obtained when the TIV values of the copolymer mix are the same as those of the natural rubber mix. This can also be seen from FIG. 2 in which the dotted line indicates the TIV of the natural rubber mixes with constant formulation. The curve obtained by plotting the values of adhesion between the two mixes on the ordinates and the TIV values of the mixes of copolymer with variable formulation on the abscissae reaches a maximum corresponding to the TIV of the mix based on natural rubber (2′35″).

EXAMPLE III

Mixes based on natural rubber, having fixed formulation of the peroxidic agents, are made to adhere to mixes based on ethylene-propylene copolymer containing variable amounts of peroxide.

The mixes have the following compositions:

Rubber mix: Parts by wt.
Natural rubber (smoked sheet) ML (1+4) 100° C.=40 _____ 100
Anhydrous silica _____ 40
Zinc oxide _____ 5
2,2-methylen-bis(4-methyl-6-tert.butyl - phenol) (antioxidant) _____ 1
Diphenylguanidine _____ 0.5
Sulfur _____ 0.4
α,α′-Bis-(tert.butylperoxy)diisopropylbenzene _ 2.1

Copolymer mix:
Ethylene-propylene copolymer (55% by mols of propylene) ML (1+4) 100° C.=60 _____ 75
Paraffinic oil (see Example I) _____ 25
_____
100
Anhydrous silica _____ 40
Zinc oxide _____ 2
Maleic oxide _____ 4
Glycerol _____ 6
Sulfur, g. atoms/mole of peroxide _____ 2
α,α′-bis(tert.butyl-peroxy)diisopropyl-benzene _____ Variable
Covulcanization: 40′–165° C.

The mix based on the copolymer, free of vulcanization agents, was subjected to thermal mechanical treatment in an inner mixer for 15 minutes at 200° C.

The values of adhesion, as the function of the TIV, between the mixes on the basis of natural rubber and those on the basis of ethylene-propylene copolymer containing the peroxide in variable amounts are given in Table 3.

TABLE 3

| Peroxide parts by weight: | TIV of the copolymer | Adhesion, kg./cm. (at 90° C.) | TIV of natural rubber |
|---|---|---|---|
| 7.0 | 2′00″ | 3.0 | |
| 6.0 | 2′30″ | 4.2 | |
| 5.0 | 2′15″ | 8.0 | 2′35″ |
| 4.0 | 2′35″ | 11.0 | |
| 3.0 | 2′40″ | 12.5 | |
| 2.5 | 3′00″ | 12.0 | |
| 1.5 | 4′00″ | 11.0 | |
| 1.0 | 4′40″ | 10.0 | |

Figure 3:
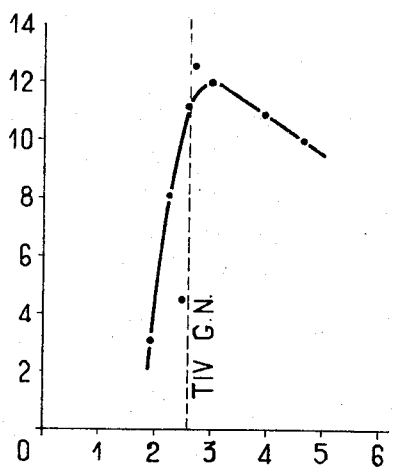

In FIG. 3, in which the dotted line indicates the TIV of the mix on the basis of natural rubber with constant formulation, it can be observed that the curve obtained by plotting the values of adhesion on the ordinates and the values of TIV of the copolymer on the abscissae reaches a maximum in the zone of coincidence of the TIV of both mixes.

EXAMPLE IV

Mixes on the basis of natural rubber having fixed formulation are made to adhere to mixes on the basis of ethylene-propylene copolymer containing variable amounts of various peroxides.

The mixes have the following composition:

Natural rubber mix: Parts by wt.
Natural ruber (smoked sheet) ML (1+4) 100° C.=40 _____ 100
Anhydrous silica _____ 40
Zinc oxide _____ 5
2,2 - methyl-bis(4-methyl-6-tert.butyl - phenol) (antioxidant) _____ 1
Diphenylguanidine _____ 0.5
Sulfur _____ 0.4
α,α′-Bis(tert.butylperoxy)-diisopropylbenzene _ 2.1

Copolymer mix:
Ethylene-propylene copolymer (55% by mols of propylene) ML (1+4) 100° C.=6° _____ 75
Paraffinic oil (see Example I) _____ 25
_____
100
Anhydrous silica _____ 40
Zinc oxide _____ 2
Maleic acid _____ 4
Glycerol _____ 6
Sulfur _____ 0.75
Various peroxides _____ Variable The mix on the basis of ethylene-propylene copolymer, free of vulcanizing agents, was subjected to thermal mechanical treatment for 15 minutes at 200° C.

The values of adhesion as a function of the TIV between the mixes on the basis of natural rubber and the mixes on the basis of the ethylene-propylene copolymer, containing different peroxides, at parity of effective peroxidic groups, are shown in Table 4.

TABLE 4

| Peroxide | Amounts by mols | TIV of the copolymer | Adhesion, kg./cm. (at 90° C.) | TIV of natural rubber | Vulcanization conditions |
|---|---|---|---|---|---|
| 2,2-bis[4,4-bis(tert.butylperoxy)cyclohexyl] propane | 0.018 | 40″ | 11.0 | | 10′, 165° C. |
| Dicumylperoxide | 0.018 | 2′00″ | 11.5 | | 30′, 165° C. |
| α,α′-bis(tert.butylperoxy)-diisopropylbenzene | 0.012 | 2′20″ | 13.0 | 2′35″ | 40′, 165° C. |
| 2,5-dimethyl-2,5-di(tert.butylperoxy)hexane | 0.0175 | 3′20″ | 13.5 | | 60′, 165° C. |
| 2,5-dimethyl-2,5-di(tert.butylperoxy)hexyn-3 | 0.012 | 4′00″ | 10.5 | | 75′, 165° C. |

EXAMPLE V

Mixes on the basis of natural rubber having fixed formulation of the vulcanizing agents are made to adhere to mixes on the basis of ethylene-propylene copolymer containing variable amounts of an organic peroxide.

The mixes have the following composition:

Rubber mix: Parts by wt.
Natural rubber (smoked sheet) NL (1+4) 100° C.=40 _____ 100
Anhydrous silica _____ 40
Zinc oxide _____ 5
2,2-methylen-bis(4-methyl-6-tert. butyl phenol) (antioxidant) _____ 1
Diphenylguanidine _____ 0.5
Sulfur _____ 2.5
N-cyclohexyl-2-benzothiazol-sulfonamide _____ 1.2

Copolymer mix:
Ethylene-propylene copolymer (55% by mols of propylene) ML (1+4) 100° C.=60 ____ 75
Paraffinic oil (see Example I) _____ 25
_____
100

| | |
|---|---|
| HAF carbon black | 50 |
| Zinc oxide | 5 |
| Polymerized 2,2,4-trimethyl-1,2-dihydroquinoline (antioxidant) | 0.5 |
| Pine tar | 0.5 |
| Sulfur, g. atoms/mole of peroxide | 2 |
| α,α'-Bis(tert. butyl-peroxy)diisopropylbenzene | Variable |

Co-vulcanization: 40' at 165° C.

The values of adhesion as a function of TIV between the mixes on the basis of natural rubber containing fixed amounts of sulfur and accelerators and the mixes on the basis of the olefin copolymer containing variable amounts of an organic peroxide are given in Table 5.

TABLE 5

| | TIV of the copolymer | Adhesion, kg./cm. (at 90° C.) | TIV of natural rubber |
|---|---|---|---|
| Peroxide parts by weight: | | | |
| 7 | 3'20" | 2.5 | |
| 6 | 3'20" | 3.5 | |
| 5 | 4'00" | 8.5 | |
| 4 | 4'00" | 10.0 | |
| 3 | 4'20" | 10.5 | 4'30" |
| 2.5 | 4'40" | 12.5 | |
| 2 | 5'20" | 8.5 | |
| 1.5 | 7'20" | 6.5 | |
| 1 | 8'00" | 2.5 | |

Figure 4:
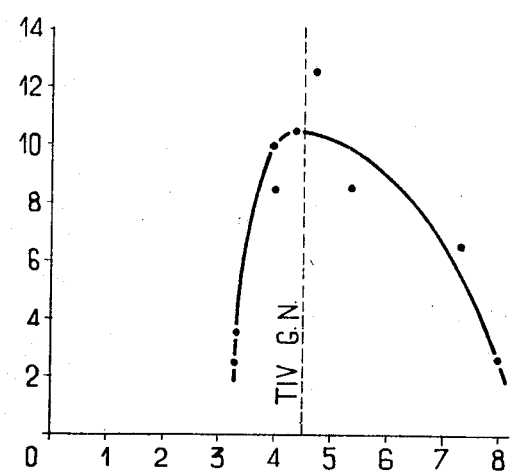

In FIG. 4, in which the values of adhesion between the two elastomers are reported on the ordinates and the TIV of the mix on the basis of copolymers are reported on the abscissae and the dotted line indicates the TIV of the mix on the basis of natural rubber with constant formulation, it can be observed that the maximum of adhesion is obtained when the TIV of both mixes coincide.

EXAMPLE VI

Mixes on the basis of natural rubber having constant formulation of the vulcanizing agents are made to adhere to mixes on the basis of ethylene-propylene copolymers containing peroxides, with different vulcanization rates.

The mixes have the following compositions:

Rubber mix: Parts by wt.

| | |
|---|---|
| Natural rubber (smoked sheet) ML (1+4) 100° C.=40 | 100 |
| Anhydrous silica | 40 |
| Zinc oxide | 5 |
| 2,2'-methylen-bis(4-methyl-6-tert. butyl phenol) (antioxidant) | 1 |
| Diphenylguanidine | 0.5 |
| Sulfur | 2.5 |
| N-cyclohexyl-2-benzothiazol-sulphonamide | 1.5 |

Copolymer mix:

| | |
|---|---|
| Ethylene-propylene copolymers (55% by mols of propylene); ML (1+4) 100° C.=60 | 75 |
| Paraffinic oil (see Example I) | 25 |
| | 100 |
| HAF carbon black | 50 |
| Zinc oxide | 5 |
| Polymerized 2,2,4-trimethyl-1,2-dihydroquinoline (antioxidant) | 0.5 |
| Pine tar | 0.5 |
| Sulfur | 0.5 |
| Various peroxides | Variable |

Table 6 gives the values of adhesion, as a function of the TIV, between the mixes on the basis of natural rubber with constant composition and the mixes on the basis of the olefin copolymers containing different peroxides, at parity of effective peroxidic groups.

TABLE 6

| Peroxide type | Amounts by mols | TIV of the copolymers | Adhesion, kg./cm. (at 90° C.) | TIV of natural rubber | Vulcanization conditions |
|---|---|---|---|---|---|
| 2,2-bis[4,4-bis(tert.butylperoxy) cyclohexyl] propane | 0.013 | 1'00" | 3.0 | | 10, 165° C. |
| 2,2,5,5-tetra(tert.butylperoxy)hexane | 0.013 | 2'00" | 7.5 | 4'30" | 15', 165° C. |
| Dicumylperoxide | 0.013 | 3'50" | 10.5 | | 30', 165° C. |
| α,α-'bis(tert.butylperoxy)-diisopropylbenzene | 0.0087 | 4'40" | 11.0 | | 40', 165° C. |
| Tetrachloro di-tert.butylperoxide | 0.013 | 4'40" | 10.5 | | 50', 165° C. |
| 2,5-dimethyl-2,5-di-(tert,butylperoxy)hexane | 0.012 | 6'00" | 10 | | 60', 165° C. |

Figure 5:
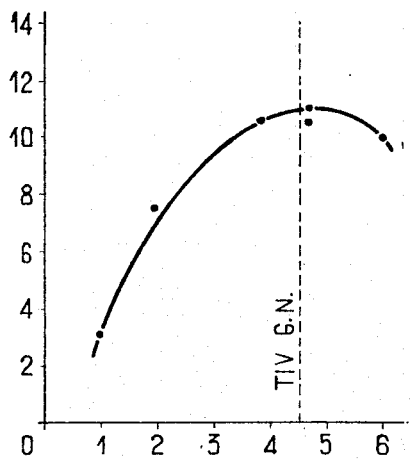

In FIG. 5, as can be noted, the maximum of the curve obtained by reporting the TIV of the copolymer on the abscissae and the adhesion on the ordinates is obtained when the TIV of the mixes of the copolymer and of natural rubber practically coincide; the dotted line of this figure shows the TIV of the mix on the basis of natural rubber with constant formulation.

EXAMPLE VII

Mixes on the basis of natural rubber, containing variable amounts of peroxide as vulcanization agent, are made to adhere to mixes on the basis of ethylene-propylene copolymer with fixed formulation of peroxides.

The mixes have the following compositions:

Copolymer mix: Parts by wt.

| | |
|---|---|
| Ethylene-propylene copolymer (55% of mols of propylene) ML (1+4) 100° C.=60 | 75 |
| Paraffinic oil (see Example I) | 25 |
| | 100 |
| Anhydrous silica | 40 |
| Zinc oxide | 2 |
| Maleic acid | 2 |
| Glycerol | 6 |
| Sulfur | 0.75 |
| α,α'-Bis(tert. butylperoxy) diisopropylbenzene | 4 |

Rubber mix:

| | |
|---|---|
| Natural rubber (smoked sheet) ML (1+4) 100° C.=40 | 100 |
| Anhydrous silica | 40 |
| Zinc oxide | 5 |
| 2,2'-methylen-bis(1-methyl-6-tert. butylphenol) (antioxidant) | 1 |
| Diphenylguanidine | 0.5 |
| α,α'-Bis(tert. butylperoxy) diisopropylbenzene | Variable amounts |

Covulcanization: 40' at 165° C.

The mix on the basis of olefin copolymer, before the addition of the vulcanization agents, was subjected to thermal mechanical treatment for 15 minutes at 200° C.

The following Table 7 shows the values of adhesion as the function of the TIV between the mixes on the basis of ethylene-propylene copolymer with fixed formulation and the mixes of natural rubber containing, as vulcanizing agent, a peroxide in various proportions.

TABLE 7

| | TIV of natural rubber | Adhesion, kg./cm. (at 90° C.) | TIV of the copolymer |
|---|---|---|---|
| Peroxide parts by weight: | | | |
| 2.0 | 1'30" | 10.5 | |
| 1.8 | 1'50" | 10.5 | |
| 1.5 | 1'50" | 11.5 | |
| 1.0 | 2'20" | 10.0 | 2'00" |
| 0.8 | 2'40" | 7.5 | |
| 0.5 | 3'00" | 5.0 | |
| 0.2 | 3'40" | 4.0 | |

Figure 6:
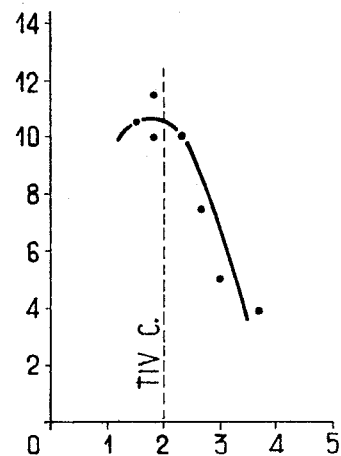

As can be observed also in FIG. 6 of the drawing, which illustrates the curve obtained by plotting the adhesion values on the ordinates and the TIV of the mixes of natural rubber with variable formulation on the abscissae and in which the dotted line indicates the TIV of the mix of ethylene-propylene copolymer with constant formulation, a maximum for the adhesion between olefin copolymers and natural rubber is obtained when the TIV values of the mixes coincide.

EXAMPLE VIII

Mixes on the basis of natural rubber having fixed formulation of the vulcanized agents (sulfur+accelerator) are made to adhere to two different mixes on the basis of ethylene - propylene copolymer containing variable amounts of organic peroxides and having different Mooney viscosities.

The mixes have the following composition:

|  | Parts of weight | |
|---|---|---|
| Rubber mix: | | |
| Natural rubber (smoked sheet) ML (1+4) 100° C.=40 | 100 | |
| Anhydrous silica | 40 | |
| Zinc oxide | 5 | |
| 2,2-methylen-bis(4-methyl-6-tert.butylphenol) (antioxidant) | 1 | |
| Diphenylguanidine | 0.5 | |
| Sulfur | 2.5 | |
| N-cyclohexyl-2-benzothiazolesulphonamide | 1.2 | |
| Copolymer Mix: | | |
| Ethylene-propylene copolymer (55% by mols of propylene) ML (1+4) 100° C. | 100 | |
| Ethylene-propylene copolymer (55% by mols of propylene) ML (1+4) 100° C.=32 | | 100 |
| HAF carbon black | 50 | 50 |
| Zinc oxide | 5 | 5 |
| Polymerized 2,2,4-trimethyl-1,2-dihydroquinoline (antioxidant) | 0.5 | 0.5 |
| Pinetar | 0.5 | 0.5 |
| α,α'-bis(tert-butyl-peroxy) diisopropylbenzene | Variable | Variable[2] |
| Sulfur | 2 | [1] |

[1] Grams atm./mole of peroxide.
Note.—Covulcanization: 40'-165° C.

In the following Table 8 are reported the values of adhesion as a function of TIV between mixes on the basis of natural rubber, with fixed formulation of the cross-linking agents, and the mixes on the basis of olefin copolymer with different Mooney viscosities and containing different amounts of peroxide.

TABLE 8

| Mix on the basis of ethylene-propylene copolymer with ML (1+4) 100° C.=32 | | | Mix on the basis of ethylene-propylene copolymer with ML (1+4) 100° C.=60 | | | |
|---|---|---|---|---|---|---|
| Peroxide, parts by weight | TIV | Adhesion, kg./cm. (at 90° C.) | Peroxide, parts by weight | TIV | Adhesion, kg./cm. (at 90° C.) | TIV of natural rubber |
| 4.2 | 2'00" | 14.0 | 4.0 | 2'05" | 13.5 | |
| 4.0 | 2'40" | 14.0 | 3.0 | 3'00" | 13.5 | |
| 3.4 | 3'00" | 12.0 | 2.5 | 3'20" | 9.3 | 2'35" |
| 3.0 | 3'10" | 7.0 | 2.0 | 3'30" | 3.5 | |
| 2.5 | 3'20" | 4.0 | 1.5 | 3'40" | 2.8 | |
| 2.0 | 4'00" | 1.8 | 1.0 | 5'00" | 1.6 | |
| 1.5 | 4'20" | 1.5 | 0.5 | 6'00" | 1.5 | |

Figure 7:
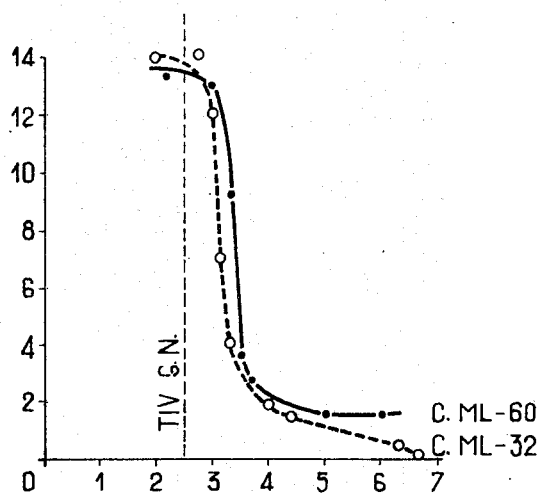

From this table, as well as from FIG. 7 of the drawing, in which the TIV values of the two series of mixes on the basis of copolymer with variable formulation and viscosity are plotted on the abscissae and the adhesion value between natural rubber and copolymer are reported on the ordinates, and in which the vertical dotted line "TIV G.N." indicates the TIV values of the mix on the basis of natural rubber with constant formulation, it can be observed that the maximum values of adhesion are obtained when the TIV values of both mixes of copolymers with ML 60 and ML 32 practically coincide with that of the mix of natural rubber, while the viscosities alone have no influence on the adhesion.

EXAMPLE IX

Mixes having constant composition, on the basis of polybutadiene and GRS rubber, type 1500, respectively, are made to adhere to mixes of ethylene-propylene copolymer containing variable amounts of peroxidic vulcanizing agents.

The mixes have the following composition:

| Homopolymer mix: | Parts by wt. |
|---|---|
| Polybutadiene (molecular weight of about 100,000) ML (1+4) 100° C.=24 | 100 |
| Anhydrous silica | 40 |
| Stearic acid | 1 |
| 2,6-di-tert. butyl-4-methylphenol (antioxidant) | 1 |
| Aromatic oil (V.G.C.=0.996, $d_{15}$=1.028) | 5 |
| α,α'-Bis(tert. butylperoxy) diisopropylbenzene | 3.75 |
| GRS copolymer mix: | |
| Butadiene-styrene copolymer, type 1500 ML (1+4) 100° C.=45 | 100 |
| Anhydrous silica | 40 |
| Stearic acid | 1.5 |
| Phenylbetanaphthylamine | 1.0 |
| Naphthenic oil (V.G.C.=0.885, $d_{15}$=0.948) | 3.0 |
| α,α'-Bis(tert. butylperoxy)diisopropylbenzene | 3.75 |
| Olefin copolymer mix: | |
| Ethylene-propylene copolymer (55% by mols of propylene): ML (1+4) 100° C.=60 | 75 |
| Paraffinic oil (see Example I) | 25 |
| | 100 |
| Anhydrous silica | 40 |
| Zinc oxide | 2 |
| Maleic acid | 4 |
| Sulfur, g. atom/mole of peroxide | 2 |
| α,α'-Bis(tert. butylperoxy)diisopropylbenzene | Variable |

Covulcanization: 40' at 165° C.

The mix on the basis of ethylene-propylene copolymer, before the addition of the vulcanizing agents, was subjected to a thermal mechanical pretreatment in an inner mixer at 200° C. for 15 minutes.

The following Table 9 shows the values of adhesion, as a function of the TIV, between the mixes on the basis of polybutadiene or of GRS rubber with fixed formulation, and the mixes on the basis of ethylene-propylene copolymer container variable amounts of peroxidic vulcanization agent.

TABLE 9

| | TIV of the ethylene-propylene copolymer | Ethylene-propylene copolymer/polybutadiene-adhesion, kg./cm | | TIV of polybutadiene | Ethylene-propylene copolymer/GRS rubber adhesion, kg./cm | | TIV of GRS rubber |
|---|---|---|---|---|---|---|---|
| | | At 25° C. | At 90° C. | | At 25° C. | At 90° C. | |
| Peroxide parts by weight: | | | | | | | |
| 1.5 | 4'50" | 9.0 | 4.0 | | 6.5 | 2.5 | |
| 2.0 | 4'20" | 12.0 | 5.5 | | 8.0 | 3.0 | |
| 2.5 | 3'40" | 15.5 | 8.5 | | 11.0 | 4.5 | 2'20" |
| 3.0 | 3'00" | 14.5 | 8.25 | 3'00" | 14.0 | 5.0 | |
| 3.5 | 2'40" | 8.5 | 6.5 | | 18.0 | 8.5 | |
| 4.0 | 2'00" | 8.0 | 5.5 | | 20.0 | 9.0 | |
| 5.0 | 1'50" | 7.5 | 4.25 | | 20.0 | 8.0 | |

EXAMPLE X

A mix on the basis of natural rubber containing the vulcanizing agents in constant formulation is made to adhere to a mix on the basis of ethylene-propylenecyclo-octadiene-1,5 terpolymer containing various vulcanization systems.

The mixes have the following composition:

| Rubber mix: | Parts by wt. |
|---|---|
| Natural rubber (smoked sheet) ML (1+4) 100° C.=40 | 100 |
| Anhydrous silica | 40 |
| Zinc oxide | 5 |
| 2,2'-methylene-bis(4-methyl-6-tert. butylphenyl) (antioxidant) | 1 |
| Diphenylguanidine | 0.5 |
| Sulfur | 0.4 |
| $\alpha,\alpha'$-bis(tert. butylperoxy)dissopropyl-benzene | 2.1 |

| Copolymer Mix | Mix A | Mix B |
|---|---|---|
| Ethylene/propylene/cyclooctadiene-1,5 terpolymer (53% by weight of propylene, 3.96% by weight of cyclo-octadiene): | | |
| ML (1+4) 100° C.=40 | 100 | 100 |
| Anhydrous silica | 40 | 40 |
| Maleic acid | 4 | 4 |
| Zinc oxide | 2 | 2 |
| Glycerol | 6 | 6 |
| Phenylbetanaphthylamine | 1 | |
| Tetramethylthiuramdisulfide | 1 | |
| Mercaptobenzothiazole | 0.5 | |
| Sulfur | 2 | 0.4 |
| $\alpha,\alpha'$-bis(tert-butylperoxy) diisopropylbenzene | | 2.1 |

NOTE.—Covulcanization: 40', 165° C.

The mix on the basis of terpolymer, free of vulcanizing agents, was thermally pretreated in an inner mixer for 15 minutes at 200° C.

The values of adhesion, as a function of the TIV, between the mixes on the basis of natural rubber and the mixes on the basis of terpolymer are reported in Table 10.

TABLE 10

| | |
|---|---|
| TIV of natural rubber | 2'40" |
| Terpolymer A/natural rubber-Adhesion, kg./cm.: | |
| 25° C. | 23.0 |
| 90° C. | 10.5 |
| 150° C. | 6.5 |
| TIV of the terpolymer A | 2'50" |
| Terpolymer B/natural rubber/Adhesion, kc./cm.: | |
| 25° C. | 24 |
| 90° C. | 12 |
| 150° C. | 8.5 |
| TIV of terpolymer B | 2'50" |

EXAMPLE XI

Some commercial tires were retreaded with a tread of ethylene-propylene (50:50 by mols) having a Mooney viscosity ML (1+4) 100° C.=60, extended with paraffinic oil in the proportions of 75% of copolymer and 25% of oil.

The composition of the various mixes is reported in Table 11.

TABLE 11

| Composition of the mixes | A | B | C |
|---|---|---|---|
| Natural rubber (smoked sheet) ML (1+4) 100° C.=40 | 100 | | |
| Ethylene-propylene copolymer (55% by mols $C_3H_6$) ML(1+4)100° C.=60, 75 Paraffinic oil (see Example I), 25 | | 100 | 100 |
| Anhydrous silica | 40 | 40 | |
| HAF carbon black | | | 50 |
| Zinc oxide | 5 | 2 | 5 |
| 2,2'-methylen-bis(4-methyl-6-tert.butyl(phenol) (antioxidant) | 0.5 | | |
| Diphenylguanidine | 0.5 | | |
| Polymerized 2,2,4-trimethyl-1,2-dihydroquinoline (antioxidant) | 0 | 1 | 1 |
| Glycerol | | 6 | |
| Maleic acid | | 4 | |
| Sulfur | 0.5 | 0.6 | 0.6 |
| $\alpha,\alpha'$-bis(tert.butylperoxy) diisopropylbenzene (at 40%) | 5.25 | 8.5 | 8.5 |

The retreading of the tire with a tread of ethylene-propylene copolymer and its adhesion to the carcass of vulcanized natural rubber was obtained by carrying out the following operations:

(1) Spreading the rasped carcass with an adhesive consisting of a 20% heptane solution of the mix on the basis of natural rubber type A of Table 11.

(2) Application onto the carcass of a sheet of type A mix, having a thickness of 1 mm.

(3) Treatment with heptane of the surface of the mineral rubber sheet applied onto the carcass and of a type B sheet on the basis of copolymer (see Table 11). Mix B, before addition of the vulcanizing agents, was subjected to a thermal mechanical treatment in an inner mixer for 15 minutes at 200° C.

(4) Application onto the sheet of natural rubber of the type B sheet on the basis of copolymers, having a thickness of 1 mm. onto the natural rubber sheet.

(5) Application of the tread (mix C, Table 11).

(6) Vulcanization of the assembled tires in a suitable mold at the temperature of 160° C. for 50 minutes.

These tires were tested on a wheel-road at 60 km./h. with a load of 600 kg. with highly satisfactory results.

In no case was there a separation of the tread from the carcass.

EXAMPLE XII

Some tires were manufactured with a carcass of natural rubber and a tread of ethylene-propylene copolymer (50:50 by mols) with a Mooney viscosity ML (1+4) 100° C.=660, extended with a paraffinic oil in the proportion of 75% of copolymer and 25% of oil.

The manufacture of the tires was carried out as follows:

(1) Arrangement on the drum of the manufacturing machine of the plyings with the mix on the basis of natural rubber having the following composition:

| Rubber mix: | Parts by wt. |
|---|---|
| Natural rubber (smoked sheet) ML(1+4) 100° C.=40 | 100 |
| SRF carbon black | 25 |
| Zinc oxide | 1 |
| Stearic acid | 1 |
| Phenylbetanaphthylamine | 1 |
| Pine tar | 1 |
| Di-orthotolylguanidine | 0.75 |
| N-cyclohexyl-2-benzothiazolsulfonamide | 0.15 |
| Sulfur | 2.8 |

(2) Application of a 1-mm. thick substrate of mix A of natural rubber (see Table 11).

(3) Treatment with heptane of the natural rubber sheet already applied onto the carcass and of a sheet of mix B on the basis of copolymer (see Table 11).

(4) Application of the sheet of mix B, 1-mm. thick.

(5) Application of the tread of ethylene-propylene copolymer (mix C of Table 11).

The tires thus assembled were vulcanized in a suitable mold at the temperature of 160° C. for 50 minutes.

These tires, tested on a wheel-road at 60 km./h. with a load of 600 kg., did not show any separation of the tread from the carcass.

EXAMPLE XIII

Various pairs of mixes on the basis of natural rubber and of ethylene-propylene copolymer, containing siliceous fillers of various types but the same filler in each pair, were prepared. These pairs of of mixes were covulcanized by using the same cross-linking agents.

The mixes had the following compositions:

Rubber mix: Parts by wt.
- Natural rubber (smoked sheet) ML(1+4) 100° C.=40 —— 100
- Siliceous filler —— 40
- Zinc oxide —— 5
- 2,2-methylen-bis(4-methyl-6-tert.butylphenol) (antioxidant) —— 1
- Diphenylguanidine —— 0.5
- Sulfur —— 0.4
- α,α'-Bis(tert.butylperoxy)diisopropylbenzene —— 2.1

Copolymer mix: Parts by wt.
- Ethylene-propylene copolymer (55% by mols of propylene); ML(1+4) 100° C.=60 —— 75
- Paraffinic oil (see Example 1) —— 25

100

- Siliceous filler [1] —— 40
- Zinc oxide —— 5
- Maleic acid —— 4
- Glycerol —— 6
- Sulfur [1] —— 0.75
- α,α'-Bis(tert.butylperoxy)diisopropylbenzene [1] —— 4

[1] When Al silicate is used, it is used in an amount of 100 parts per 100 parts of copolymer instead of 40 and the sulfur and peroxide amounts are reduced to 0.6 and 3.4 parts, respectively.

The mixes on the basis of the olefin copolymer are subjected to a thermal treatment at 200° C. for 15 minutes before the introduction of the vulcanizing agents.

In the following table are reported the TIV values of the two mixes by varying the type of siliceous filler, and the adhesion values in the zone of coincidence of the TIV values of the two mixes, as a function of temperature.

TABLE 13

| Filler type | Chemical name | TIV of natural rubber | TIV of the copolymer | Adhesion, kg./cm. 25° C. | Adhesion, kg./cm. 90° C. |
| --- | --- | --- | --- | --- | --- |
| Cab-o-sil | Anhydrous silica | 2'10" | 2'20" | 25.0 | 12.5 |
| Santocel | do | 1'50" | 2'00" | 35.0 | 10.5 |
| Hisil 233 | Hydrated silica | 1'50" | 2'10" | 24.0 | 12.5 |
| Ultrasil | do | 2'10" | 2'30" | 25.0 | 11.00 |
| Frantex B | Al silicate | 2'00" | 2'00" | 20.0 | 10.0 |

It will be obvious that various changes and modifications may be made in practicing this invention without departing from its spirit. Therefore, we intend to include in the appended claims all such modifications and variations in details as will be obvious to those skilled in the art from the description and working examples given herein.

We claim:

1. In a process for obtaining improved adhesion between a first layer of a dienic rubber containing a vulcanizing agent and reinforcing filler therefor, and a second layer of a material selected from the group consisting of amorphous, saturated, elastomeric, vulcanizable copolymers of ethylene and a higher alpha-olefin and elastomeric, vulcanizable terpolymers of ethylene, a higher alpha-olefin and a non-conjugated diene selecter from the group consisting of cyclic and acyclic dienes and also containing a vulcanizing agent and reinforcing filler therefor, by covulcanization of the two layers disposed in direct contact with each other, at temperatures between 110° C. and 230° C., the improvement wherein the layer of dienic rubber contains as the only filler a siliceous filler selected from the group consisting of talc, anhydrous silica, hydrated silica, aluminum silicate, calcium silicate, magnesium silicate and Bentonite, and the covulcanization is carried out with vulcanization starting times which are essentially the same for the dienic rubber and for the copolymer or terpolymer and that are higher than a minimum value of 2 minutes, the vulcanization starting times being taken as the time interval elapsing between the first minute after the layers in direct contact are introduced into a Mooney viscometer maintained at 150° C. and the moment in which the viscosity of the mass starts to rise.

2. The process of claim 1 wherein said second layer comprises an amorphous, saturated, elastomeric, vulcanizable copolymer of ethylene and a higher alpha-olefin, the vulcanizing agent of said second layer consisting of an organic peroxide and a free-radical acceptor.

3. The process of claim 1 wherein said second layer comprises an elastomeric, vulcanizable low-unsaturation terpolymer of ethylene, a high alpha-olefin, and a non-conjugated diene selected from the group consisting of cyclic and acyclic dienes, the vulcanizing agent of said second layer being sulfur.

4. The process of claim 1 wherein sulfur is the vulcanizing agent in said first layer.

5. The process of claim 1 wherein said first layer comprises a diene rubber, and said second layer comprises an amorphous, saturated, elastomeric, vulcanizable copolymer of ethylene and a higher alpha-olefin, the compositions of both of said layers comprising vulcanizing agents consisting of organic peroxides and a free-radical acceptor.

6. The process of claim 5 wherein said amorphous, saturated, elastomeric, vulcanizable copolymer is a copolymer of ethylene and propylene.

7. The process of claim 5 wherein said free-radical acceptor is sulfur.

8. The process of claim 6 wherein said free-radical acceptor is sulfur.

9. The process of claim 1 wherein the siliceous filler in said first layer is present in an amount of from 5 to 200 parts by weight per 100 parts of the diene rubber.

10. The process of claim 9 wherein the siliceous filler is present in an amount of from 20 to 100 parts by weight, per 100 parts of the diene rubber.

11. The process of claim 1 wherein the reinforcing filler in said second layer is selected from the group consisting of carbon black, talc, silica, silicates, alumina, kaolin and clay.

12. The process of claim 1 wherein the reinforcing filler in both of said first and second layers is the same siliceous material.

13. The process of claim 1 wherein said diene rubber is natural rubber.

14. The process of claim 1 wherein said diene rubber is polybutadiene.

15. The process of claim 1 wherein said diene rubber is polyisoprene.

16. The process of claim 1 wherein said diene rubber is polyisoprene, and the filler in said first layer is silica.

17. The process of claim 1 wherein said diene rubber is a copolymer of butadiene and styrene.

18. The process of claim 1 wherein said unsaturated amorphous copolymer of ethylene and a higher alpha-olefin is a copolymer of ethylene and propylene containing from 20 to 80 mol percent of ethylene and having a molecular weight of from 60,000 to 800,000.

19. The process of claim 1 wherein said unsaturated amorphous copolymer of ethylene and a higher alpha-olefin is a copolymer of ethylene and butene-1 containing from 20 to 80 mol percent of ethylene and having a molecular weight of from 60,000 to 800,000.

20. The process of claim 1 wherein said elastomeric low-unsaturated terpolymer is a terpolymer of ethylene, propylene, and dicyclopentadiene having an ethylene content of from 20 to 80 mol percent and containing from 0.05 to 1.0 double bond per 100 carbon atoms.

21. The process of claim 1 wherein said elastomeric low-unsaturated terpolymer is a terpolymer of ethylene, butene-1, and dicyclopentadiene having an ethylene content of from 20 to 80 mol percent and containing from 0.05 to 1.0 double bond per 100 carbon atoms.

References Cited
UNITED STATES PATENTS

| | | | |
|---|---|---|---|
| 3,011,931 | 12/1961 | Carpenter | 152—354 |
| 3,260,641 | 7/1966 | Falcone | 161—242 |
| 3,296,061 | 1/1967 | Tavenor et al. | 161—240 |
| 3,311,151 | 3/1967 | Willis et al. | 152—357 |

OTHER REFERENCES

Anon: A Technical Report on Nordel Hydrocarbons Rubber, du Pont de Nemours and Company, April (1964), page 15 and title page relied on.

Sjothun. Vulcanization of Elastomers, Feb. 17, 1964, pp. 13, 14, 42–44, 57–59, 391 relied on.

HAROLD ANSHER, Primary Examiner

W. E. HOAG, Assistant Examiner

U.S. Cl. X.R.

152—330; 156—128; 161—242

PO-1050
(5/69)

UNITED STATES PATENT OFFICE
CERTIFICATE OF CORRECTION

Patent No. 3,514,357   Dated May 26, 1970

Inventor(s) Luigi Torti, Stefano Marcello, and Guido Bertelli

It is certified that error appears in the above-identified patent and that said Letters Patent are hereby corrected as shown below:

Column 3, line 55, "vculcanization" should read -- vulcanization --. Column 4, line 8, "sulfur" should read -- sulfur, --; lines 17 and 18, "for example with carbon black," should read -- for example, carbon black --. Column 8, line 13, "ruber" should read -- rubber --; line 24, "6°" should read -- 60 --. Column 10, line 42, "Maleic acid ------ 2" should read -- Maleic acid ------ 4 --. Column 11, line 28, "polymer Mix:" should read -- Copolymer Mix: --; line 29, "CopEthylene-propylene" should read -- Ethylene-propylene--; line 34, "Pinetar" should read -- Pine tar --; line 35, "Variabe2" should read -- Variable --; line 36, "'1" should read -- '2 --. Column 13, line 55, "ethylene-propylene (50:50 by mols)" should read -- ethylene-propylene copolymer (50:50 by mols) --. Column 14, line 11, "mineral" should read -- natural --; line 31 "100°C=660," should read -- 100°C=60, --; line 74, "pairs of of" should read -- pairs of --. Column 15, line 7 "2,2-" should read -- 2,2'- --; Table 13, column marked "90°C", "11.00" should read -- 11.0 --.

SIGNED AND SEALED
JAN 12 1971

(SEAL)
Attest:

Edward M. Fletcher, Jr.
Attesting Officer

WILLIAM E. SCHUYLER, JR.
Commissioner of Patents